US008810925B2

(12) United States Patent
Chang et al.

(10) Patent No.: US 8,810,925 B2
(45) Date of Patent: Aug. 19, 2014

(54) IMAGING LENS HAVING FIVE LENS ELEMENTS AND ELECTRONIC APPARATUS HAVING THE SAME

(71) Applicant: Genius Electronic Optical Co., Ltd., Taichung (TW)

(72) Inventors: Kuo-Wen Chang, Taichung (TW); Poche Lee, Taichung (TW); Sheng-Wei Hsu, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/149,523

(22) Filed: Jan. 7, 2014

(65) Prior Publication Data

US 2014/0118851 A1 May 1, 2014

Related U.S. Application Data

(63) Continuation of application No. 13/617,304, filed on Sep. 14, 2012.

(30) Foreign Application Priority Data

Mar. 30, 2012 (TW) .............................. 101111478 A

(51) Int. Cl.
*G02B 13/18* (2006.01)
*G02B 9/60* (2006.01)
*H04N 5/225* (2006.01)
*G02B 13/00* (2006.01)

(52) U.S. Cl.
CPC .................. *G02B 9/60* (2013.01); *H04N 5/225* (2013.01); *G02B 13/0045* (2013.01); *G02B 13/18* (2013.01)
USPC ............................ 359/714; 359/763; 359/764

(58) Field of Classification Search
CPC ....... G02B 13/0045; G02B 13/18; G02B 9/60
USPC .......................................................... 359/714
See application file for complete search history.

(56) References Cited

U.S. PATENT DOCUMENTS

| 2,445,594 A | 7/1948 | Bennett |
| 3,936,153 A | 2/1976 | Ogura |

(Continued)

FOREIGN PATENT DOCUMENTS

| JP | 2009-294527 A | 12/2009 |
| TW | 201227044 A | 7/2012 |
| WO | 2010024198 A1 | 3/2010 |

OTHER PUBLICATIONS

Notice of Allowance mailed Mar. 20, 2014 in U.S. Appl. No. 14/149,504, 9 pages.

(Continued)

*Primary Examiner* — Scott J Sugarman
(74) *Attorney, Agent, or Firm* — Kilpatrick Townsend & Stockton LLP

(57) ABSTRACT

An optical imaging lens includes, from an object side to an image side, an aperture stop, first, second, third, fourth, and fifth lens elements. The first lens element has a positive refracting power, and its object-side surface has a convex portion near an optical axis and a convex portion near its periphery. The second lens element has a negative refracting power. The third lens element has a negative refracting power, and its object-side surface has a concave portion near its periphery. The fourth lens element has a positive refracting power, an object-side surface having a concave portion near the optical axis and a concave portion near its periphery, and an image-side surface having a convex portion near the optical axis and a convex portion near its periphery. The image-side surface of the fifth lens element has a concave portion near the optical axis and a convex portion near its periphery.

19 Claims, 18 Drawing Sheets

(56) References Cited

U.S. PATENT DOCUMENTS

| | | | |
|---|---|---|---|
| 4,674,844 | A | 6/1987 | Nishioka et al. |
| 6,650,486 | B2 | 11/2003 | Chen |
| 6,940,661 | B2 | 9/2005 | Chen |
| 7,826,151 | B2 | 11/2010 | Tsai |
| 7,864,454 | B1 | 1/2011 | Tang et al. |
| 7,911,711 | B1 | 3/2011 | Tang |
| 8,000,031 | B1 | 8/2011 | Tsai |
| 8,072,695 | B1 | 12/2011 | Lee et al. |
| 8,179,613 | B2 | 5/2012 | Sano |
| 8,189,273 | B2 | 5/2012 | Noda |
| 8,233,224 | B2 | 7/2012 | Chen |
| 8,310,768 | B2 | 11/2012 | Lin et al. |
| 8,325,429 | B2 | 12/2012 | Tang |
| 8,369,029 | B2 * | 2/2013 | Tang et al. .................... 359/754 |
| 8,400,716 | B2 | 3/2013 | Jeong |
| 2004/0240080 | A1 | 12/2004 | Matsui et al. |
| 2007/0229984 | A1 | 10/2007 | Shinohara |
| 2007/0236811 | A1 | 10/2007 | Mori |
| 2012/0092544 | A1 | 4/2012 | Noda |
| 2012/0092778 | A1 | 4/2012 | Tsai et al. |
| 2012/0147482 | A1 | 6/2012 | Tsai |
| 2012/0262806 | A1 | 10/2012 | Huang |
| 2013/0016435 | A1 | 1/2013 | Tsai et al. |
| 2013/0038947 | A1 | 2/2013 | Tsai |
| 2013/0100542 | A1 | 4/2013 | Tsai |
| 2013/0258164 | A1 | 10/2013 | Chang et al. |
| 2013/0279022 | A1 * | 10/2013 | Tang et al. .................... 359/714 |

OTHER PUBLICATIONS

Notice of Allowance mailed Mar. 7, 2014 in U.S. Appl. No. 14/149,485, 11 pages.

* cited by examiner

FIG. 2

| lens element | surface | radius of curvature | thickness | refracting power | dispersion coefficient | material | focal length |
|---|---|---|---|---|---|---|---|
| object | | ∞ | 600.000 | | | | |
| aperture stop 8 | | ∞ | -0.201 | | | | |
| first lens element 3 | object-side surface 31 | 1.157 | 0.494 | 1.546 | 56.114 | plastic | 2.087 |
| | image-side surface 32 | -62.901 | 0.045 | | | | |
| second lens element 4 | object-side surface 41 | 16.214 | 0.250 | 1.611 | 26.651 | plastic | -3.558 |
| | image-side surface 42 | 1.907 | 0.312 | | | | |
| third lens element 5 | object-side surface 51 | 25.914 | 0.320 | 1.640 | 23.901 | plastic | -70.339 |
| | image-side surface 52 | 16.369 | 0.173 | | | | |
| fourth lens element 6 | object-side surface 61 | -2.584 | 0.564 | 1.536 | 56.273 | plastic | 5.713 |
| | image-side surface 62 | -1.509 | 0.269 | | | | |
| fifth lens element 7 | object-side surface 71 | 1.185 | 0.352 | 1.536 | 56.273 | plastic | -5.807 |
| | image-side surface 72 | 0.770 | 0.444 | | | | |
| optical filter 9 | object-side surface 91 | ∞ | 0.300 | | | | |
| | image-side surface 92 | ∞ | 0.360 | | | | |
| image plane 10 | | ∞ | | | | | |

| surface | 31 | 32 | 41 | 42 | 51 | 52 | 61 | 62 | 71 | 72 |
|---|---|---|---|---|---|---|---|---|---|---|
| K | 0.0000E+00 | 0.0000E+00 | 0.0000E+00 | 0.0000E+00 | 0.0000E+00 | 0.0000E+00 | 0.0000E+00 | 0.0000E+00 | -1.0000E+00 | -1 |
| $a_4$ | 0 | 0 | 0 | 0 | 0 | 0 | 0 | 0 | -1 | -1.1640E+00 |
| $a_6$ | -1.6347E-02 | 9.7547E-01 | 1.5249E+00 | 7.8939E-01 | -3.1814E-01 | -3.5995E-01 | -3.3076E-01 | 1.1599E+00 | 1.3466E+00 | 1.6397E+00 |
| $a_8$ | 2.2330E-01 | -2.8386E+00 | -4.3784E+00 | -1.3421E+00 | 2.0356E+00 | 1.7314E+00 | 5.4219E-01 | -2.5422E+00 | -9.6162E-01 | -1.9134E+00 |
| $a_{10}$ | -1.1190E+00 | 4.5048E+00 | 8.2690E+00 | 1.0631E+00 | -7.2269E+00 | -3.2243E+00 | 3.6522E+00 | 4.4345E+00 | 4.1104E-01 | 1.7379E+00 |
| $a_{12}$ | 2.4068E+00 | -3.7173E+00 | -9.0502E+00 | 4.4873E+00 | 1.1682E+01 | 3.0074E+00 | -1.2066E+01 | -4.5290E+00 | -7.8979E-02 | -1.1939E+00 |
| $a_{14}$ | -2.2350E+00 | --- | 3.5009E+00 | -1.0470E+01 | -6.3902E+00 | -1.0652E+00 | 1.5392E+01 | 2.5723E+00 | -9.0836E-03 | 6.0503E-01 |
| $a_{16}$ | --- | --- | --- | 8.4480E+00 | --- | --- | -9.4301E+00 | -7.6750E-01 | 7.8383E-03 | -2.2075E-01 |
| $a_{18}$ | --- | --- | --- | --- | --- | --- | 2.3078E+00 | 9.4820E-02 | -1.4585E-02 | 5.6104E-02 |
| $a_{20}$ | --- | --- | --- | --- | --- | --- | --- | --- | 9.2019E-05 | -9.3918E-03 |
| $a_{22}$ | --- | --- | --- | --- | --- | --- | --- | --- | --- | 9.2798E-04 |
| $a_{24}$ | --- | --- | --- | --- | --- | --- | --- | --- | --- | -4.0886E-05 |

FIG. 3

| lens element | surface | radius of curvature | thickness | refracting power | dispersion coefficient | material | focal length |
|---|---|---|---|---|---|---|---|
| object | | ∞ | 600.000 | | | | |
| aperture stop 8 | | ∞ | -0.207 | | | | |
| first lens element 3 | object-side surface 31 | 1.137 | 0.489 | 1.546 | 56.114 | plastic | 2.105 |
| | image-side surface 32 | 94.668 | 0.050 | | | | |
| second lens element 4 | object-side surface 41 | 9.144 | 0.267 | 1.637 | 23.340 | plastic | -3.555 |
| | image-side surface 42 | 1.795 | 0.308 | | | | |
| third lens element 5 | object-side surface 51 | 14.016 | 0.250 | 1.640 | 23.984 | plastic | -431.010 |
| | image-side surface 52 | 13.245 | 0.210 | | | | |
| fourth lens element 6 | object-side surface 61 | -2.064 | 0.631 | 1.536 | 55.699 | plastic | 4.386 |
| | image-side surface 62 | -1.217 | 0.110 | | | | |
| fifth lens element 7 | object-side surface 71 | 1.195 | 0.350 | 1.536 | 55.699 | plastic | -4.669 |
| | image-side surface 72 | 0.726 | 0.444 | | | | |
| optical filter 9 | object-side surface 91 | ∞ | 0.300 | | | | |
| | image-side surface 92 | ∞ | 0.452 | | | | |
| image plane 10 | | ∞ | | | | | |

| surface | 31 | 32 | 41 | 42 | 51 | 52 | 61 | 62 | 71 | 72 |
|---|---|---|---|---|---|---|---|---|---|---|
| K | 0.0000E+00 | 0.0000E+00 | 0.0000E+00 | 0.0000E+00 | 0.0000E+00 | 0.0000E+00 | 0.0000E+00 | 0.0000E+00 | -1.0000E+00 | -1.0000E+00 |
| $a_4$ | 1.2574E-02 | -1.5269E-01 | -2.3843E-01 | -1.2520E-01 | -2.9508E-01 | -1.2829E-01 | 2.7530E-01 | -2.8277E-01 | -1.2282E+00 | -1.3592E+00 |
| $a_6$ | -7.6995E-02 | 7.9340E-01 | 1.1073E+00 | 8.5090E-01 | -6.4615E-01 | -8.4090E-01 | -1.5554E+00 | 8.1686E-01 | 1.3827E+00 | 2.1464E+00 |
| $a_8$ | 5.2565E-01 | -2.1328E+00 | -2.5310E+00 | -2.2736E+00 | 3.7014E+00 | 3.1126E+00 | 3.2364E+00 | -1.8737E+00 | -7.5132E-01 | -2.9006E+00 |
| $a_{10}$ | -1.8375E+00 | 3.2228E+00 | 3.5618E+00 | 6.7662E+00 | -1.1200E+01 | -5.2941E+00 | -2.1715E-01 | 3.3394E+00 | 9.2471E-03 | 3.1262E+00 |
| $a_{12}$ | 3.2262E+00 | -2.7701E+00 | -2.7420E+00 | -1.2484E+01 | 1.6460E+01 | 4.6802E+00 | -8.0825E-01 | -3.2890E+00 | 2.5520E-01 | -2.5616E+00 |
| $a_{14}$ | -2.5031E+00 | — | -3.1911E-02 | 1.4809E+01 | -8.6976E+00 | -1.6276E+00 | 1.2717E+01 | 1.7493E+00 | -1.6411E-01 | 1.5364E+00 |
| $a_{16}$ | — | — | — | -6.6504E+00 | — | — | -8.6235E+00 | -4.8465E-01 | 4.9436E-02 | -6.5452E-01 |
| $a_{18}$ | — | — | — | — | — | — | 2.3137E+00 | 5.5901E-02 | -7.5136E-03 | 1.9123E-01 |
| $a_{20}$ | — | — | — | — | — | — | — | — | 4.6338E-04 | -2.6233E-02 |
| $a_{22}$ | — | — | — | — | — | — | — | — | — | 3.9949E-03 |
| $a_{24}$ | — | — | — | — | — | — | — | — | — | -1.9403E-04 |

| lens element | surface | radius of curvature | thickness | refracting power | dispersion coefficient | material | focal length |
|---|---|---|---|---|---|---|---|
| object | | ∞ | 600.000 | | | | |
| aperture stop 8 | | ∞ | -0.198 | | | | |
| first lens element 3 | object-side surface 31 | 1.179 | 0.484 | 1.546 | 56.114 | plastic | 2.275 |
| | image-side surface 32 | 19.848 | 0.049 | | | | |
| second lens element 4 | object-side surface 41 | 7.289 | 0.250 | 1.589 | 29.921 | plastic | -4.305 |
| | image-side surface 42 | 1.857 | 0.320 | | | | |
| third lens element 5 | object-side surface 51 | 139.493 | 0.346 | 1.640 | 23.901 | plastic | -19.088 |
| | image-side surface 52 | 11.226 | 0.159 | | | | |
| fourth lens element 6 | object-side surface 61 | -2.502 | 0.556 | 1.536 | 56.273 | plastic | 5.373 |
| | image-side surface 62 | -1.443 | 0.150 | | | | |
| fifth lens element 7 | object-side surface 71 | 1.090 | 0.375 | 1.536 | 56.273 | plastic | -8.737 |
| | image-side surface 72 | 0.778 | 0.444 | | | | |
| optical filter 9 | object-side surface 91 | ∞ | 0.300 | | | | |
| | image-side surface 92 | ∞ | 0.516 | | | | |
| image plane 10 | | | | | | | |

FIG. 10

| surface | 31 | 32 | 41 | 42 | 51 | 52 | 61 | 62 | 71 | 72 |
|---|---|---|---|---|---|---|---|---|---|---|
| K | 0.0000E+00 | 0.0000E+00 | 0.0000E+00 | 0.0000E+00 | 0.0000E+00 | 0.0000E+00 | 0.0000E+00 | 0.0000E+00 | -1.0000E+00 | -1.0000E+00 |
| $a_4$ | 7.1775E-03 | -1.6461E-01 | -2.7729E-01 | -1.3150E-01 | -3.6099E-01 | -2.7493E-01 | 1.4118E-01 | -3.5334E-01 | -1.1335E+00 | -1.0677E+00 |
| $a_6$ | 1.0717E-02 | 8.3135E-01 | 1.4542E+00 | 8.3469E-01 | -2.9309E-02 | -3.2650E-01 | -1.5271E+00 | 1.0439E+00 | 1.4079E+00 | 1.4559E+00 |
| $a_8$ | 3.3818E-04 | -2.2853E+00 | -4.6921E+00 | -2.3684E+00 | 1.5054E+00 | 1.8556E+00 | 4.4345E+00 | -2.0166E+00 | -1.1595E+00 | -1.6876E+00 |
| $a_{10}$ | -5.6976E-02 | 3.7267E+00 | 1.0864E+01 | 6.3399E+00 | -7.4028E+00 | -3.6266E+00 | -4.5735E+00 | 3.4268E+00 | 6.4583E-01 | 1.5617E+00 |
| $a_{12}$ | 2.3134E-01 | -3.1861E+00 | -1.4754E+01 | -9.4471E+00 | 1.3594E+01 | 3.5664E+00 | -4.0839E+00 | -3.4410E+00 | -2.4139E-01 | -1.1183E+00 |
| $a_{14}$ | -4.0454E-01 | — | 7.6350E+00 | 7.8002E+00 | -8.0579E+00 | -1.3302E+00 | 5.0758E+00 | 1.8980E+00 | 6.2059E-02 | 6.0060E-01 |
| $a_{16}$ | — | — | — | -1.3592E+00 | — | — | -4.3578E+00 | -5.4450E-01 | -1.1537E-02 | -2.3434E-01 |
| $a_{18}$ | — | — | — | — | — | — | 1.2525E+00 | 6.5001E-02 | 1.5146E-03 | 6.3842E-02 |
| $a_{20}$ | — | — | — | — | — | — | — | — | -1.0301E-04 | -1.1421E-02 |
| $a_{22}$ | — | — | — | — | — | — | — | — | — | 1.1978E-03 |
| $a_{24}$ | — | — | — | — | — | — | — | — | — | -5.5517E-05 |

FIG. 11

| lens element | surface | radius of curvature | thickness | refracting power | dispersion coefficient | material | focal length |
|---|---|---|---|---|---|---|---|
| object | | ∞ | 600.000 | | | | |
| aperture stop 8 | | ∞ | −0.311 | | | | |
| first lens element 3 | object-side surface 31 | 1.116 | 0.483 | 1.546 | 56.114 | plastic | 2.171 |
| | image-side surface 32 | 16.191 | 0.100 | | | | |
| second lens element 4 | object-side surface 41 | 7.444 | 0.220 | 1.640 | 23.901 | plastic | −3.704 |
| | image-side surface 42 | 1.778 | 0.303 | | | | |
| third lens element 5 | object-side surface 51 | −12.176 | 0.268 | 1.640 | 23.901 | plastic | −538.481 |
| | image-side surface 52 | −12.730 | 0.256 | | | | |
| fourth lens element 6 | object-side surface 61 | −2.314 | 0.517 | 1.536 | 56.273 | plastic | 4.132 |
| | image-side surface 62 | −1.220 | 0.100 | | | | |
| fifth lens element 7 | object-side surface 71 | 1.915 | 0.434 | 1.536 | 56.273 | plastic | −3.988 |
| | image-side surface 72 | 0.930 | 0.433 | | | | |
| optical filter 9 | object-side surface 91 | ∞ | 0.300 | | | | |
| | image-side surface 92 | ∞ | 0.492 | | | | |
| image plane 10 | | ∞ | | | | | |

FIG. 14

| surface | 31 | 32 | 41 | 42 | 51 | 52 | 61 | 62 | 71 | 72 |
|---|---|---|---|---|---|---|---|---|---|---|
| K | 0.0000E+00 | 0.0000E+00 | 0.0000E+00 | 0.0000E+00 | 0.0000E+00 | 0.0000E+00 | 0.0000E+00 | -1.0591E+00 | -1.0591E+00 | -1.0591E+00 |
| $a_4$ | -5.3867E-03 | -1.4830E-01 | -2.9959E-01 | -1.7108E-01 | -3.7937E-01 | -2.6249E-01 | 9.8948E-02 | -3.5054E-01 | -3.5054E-01 | -3.5054E-01 |
| $a_6$ | 2.5063E-01 | 7.3796E-01 | 1.3972E+00 | 9.0390E-01 | 2.2401E-01 | 2.7629E-02 | -8.7416E-01 | 1.2828E+00 | 1.2828E+00 | 1.2828E+00 |
| $a_8$ | -2.4339E+00 | -1.7755E+00 | -3.7112E+00 | -9.2224E-01 | -6.4514E-01 | 4.1985E-01 | 2.5466E+00 | -3.2290E+00 | -3.2290E+00 | -3.2290E+00 |
| $a_{10}$ | 1.5111E+01 | 2.3884E+00 | 6.6655E+00 | -1.7473E+00 | 5.1863E+00 | 1.1688E+00 | -3.8644E+00 | 5.8108E+00 | 5.8108E+00 | 5.8108E+00 |
| $a_{12}$ | -5.9133E+01 | -1.9187E+01 | -8.1498E+00 | 9.6450E+00 | -1.6983E+01 | -5.0662E+00 | 7.0568E+00 | -5.9468E+00 | -5.9468E+00 | -5.9468E+00 |
| $a_{14}$ | 1.4871E+02 | — | 4.2846E+00 | -1.0888E+01 | 2.3659E+01 | 6.1102E+00 | -1.3668E+01 | 3.0306E+00 | 3.0306E+00 | 3.0306E+00 |
| $a_{16}$ | -2.3487E+02 | — | — | -5.7599E+00 | -1.1441E+01 | -2.5152E+00 | 1.6114E+01 | -2.3045E-01 | -2.3045E-01 | -2.3045E-01 |
| $a_{18}$ | 2.1318E+02 | — | — | 1.8909E+01 | -1.1728E+00 | — | -9.6835E+00 | -5.5458E-01 | -5.5458E-01 | -5.5458E-01 |
| $a_{20}$ | -8.5757E+01 | — | — | — | — | — | 2.3166E+00 | 2.7040E-01 | 2.7040E-01 | 2.7040E-01 |
| $a_{22}$ | — | — | — | — | — | — | — | -4.1184E-02 | -4.1184E-02 | -4.1184E-02 |

FIG. 15

| relationship | first preferred embodiment | second preferred embodiment | third preferred embodiment | fourth preferred embodiment |
|---|---|---|---|---|
| $|\nu_2 - \nu_3|$ | 2.75 | 0.64 | 6.02 | 0.00 |
| $T_4/G_{AA}$ | 0.71 | 0.93 | 0.82 | 0.68 |
| $T_3/G_{AA}$ | 0.40 | 0.37 | 0.51 | 0.35 |
| $T_{L3A2-L4A1}$ | 0.17 | 0.21 | 0.16 | 0.26 |
| $T_4$ | 0.56 | 0.63 | 0.56 | 0.52 |
| $|R_7 - f_4|$ | 0.45 | 0.47 | 0.47 | 0.56 |
| $|f_4/T_{4-5}|$ | 6.86 | 5.92 | 7.61 | 6.69 |

IMAGING LENS HAVING FIVE LENS ELEMENTS AND ELECTRONIC APPARATUS HAVING THE SAME

CROSS-REFERENCES TO RELATED APPLICATIONS

This application is a continuation of U.S. application Ser. No. 13/617,304, filed Sep. 14, 2012, which claims priority to Taiwanese Application No. 101111478, filed Mar. 30, 2012, the disclosures of which are incorporated herein by reference.

BACKGROUND OF THE INVENTION

1. Field of the Invention

The present invention relates to an imaging lens and an electronic apparatus, more particularly to an imaging lens having five lens elements and an electronic apparatus having the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

In view of the above, each of Taiwanese Patent Publication Nos. 201022714, 201137430, and 201043999 discloses a conventional imaging lens with five lens elements, of which the first, second, and third lens elements have positive, negative, and positive refracting powers, respectively. Further, U.S. Patent Application Publication No. 20110249346 discloses a conventional imaging lens with five lens elements, each of which has a relatively large thickness and is spaced apart from an adjacent one of the lens elements by a relatively wide gap.

U.S. Patent Application Publication No. 20110013069 and Taiwanese Patent Publication Nos. 201144890 and 201106040 also disclose conventional imaging lenses with five lens elements.

Although the above conventional imaging lenses have reduced overall lengths, some of them may still be too long. For example, the conventional imaging lens disclosed in Taiwanese Patent Publication No. 201144890 has an overall length of 6.5 mm, which may be too long for certain miniaturized portable electronic devices.

Thus, it is apparent that the current trend in development of imaging systems for portable electronic devices focuses on reducing overall lengths of the imaging systems. However, optical performances and imaging qualities of the imaging systems may be compromised as the overall lengths are reduced.

BRIEF SUMMARY OF THE INVENTION

Therefore, an object of the present invention is to provide an imaging lens having a shorter overall length while maintaining good optical performance.

Accordingly, an imaging lens of the present invention includes first, second, third, fourth, and fifth lens elements arranged from an object side to an image side in the given order. Each of the first, second, third, fourth, and fifth lens elements has an object-side surface facing toward the object side and an image-side surface facing toward the image side.

The first lens element has a positive refracting power, and the object-side surface thereof is a convex surface. The second lens element has a negative refracting power, and the image-side surface thereof is a concave surface. The third lens element has a negative refracting power. The image-side surface of the fourth lens element is a convex surface. The image-side surface of the fifth lens element has a concave portion in a vicinity of an optical axis of the imaging lens and a convex portion in a vicinity of a periphery of the fifth lens element.

The imaging lens satisfies $|v_2 - v_3| < 10$ and $0.5 < T_4/G_{AA} < 1.0$, where:

"$v_2$" represents an Abbe number of the second lens element;
"$v_3$" represents an Abbe number of the third lens element;
"$T_4$" represents a distance between the object-side surface and the image-side surface of the fourth lens element at the optical axis; and
"$G_{AA}$" represents a sum of a distance between the image-side surface of the first lens element and the object-side surface of the second lens element at the optical axis, a distance between the image-side surface of the second lens element and the object-side surface of the third lens element at the optical axis, a distance between the image-side surface of the third lens element and the object-side surface of the fourth lens element at the optical axis, and a distance between the image-side surface of the fourth lens element and the object-side surface of the fifth lens element at the optical axis.

Another object of the present invention is to provide an electronic apparatus having an imaging lens with five lens elements.

Accordingly, an electronic apparatus of the present invention includes:
a housing; and
an imaging module disposed in the housing, and including the imaging lens of the present invention, a barrel on which the imaging lens is disposed, a seat unit on which the barrel is disposed, and an image sensor disposed at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 2 shows values of some optical parameters corresponding to the imaging lens of the first preferred embodiment;

FIG. 3 shows values of some parameters of an optical relationship corresponding to the imaging lens of the first preferred embodiment;

FIG. 6 shows values of some optical parameters corresponding to the imaging lens of the second preferred embodiment;

FIG. 7 shows values of some parameters of the optical relationship corresponding to the imaging lens of the second preferred embodiment;

FIG. 10 shows values of some optical parameters corresponding to the imaging lens of the third preferred embodiment;

FIG. 11 shows values of some parameters of the optical relationship corresponding to the imaging lens of the third preferred embodiment;

FIG. 14 shows values of some optical parameters corresponding to the imaging lens of the fourth preferred embodiment;

FIG. 15 shows values of some parameters of the optical relationship corresponding to the imaging lens of the fourth preferred embodiment;

FIG. 17 is a table that shows values of parameters of other optical relationships corresponding to the imaging lenses of the first, second, third, and fourth preferred embodiments;

DETAILED DESCRIPTION OF THE INVENTION

Figure 1:
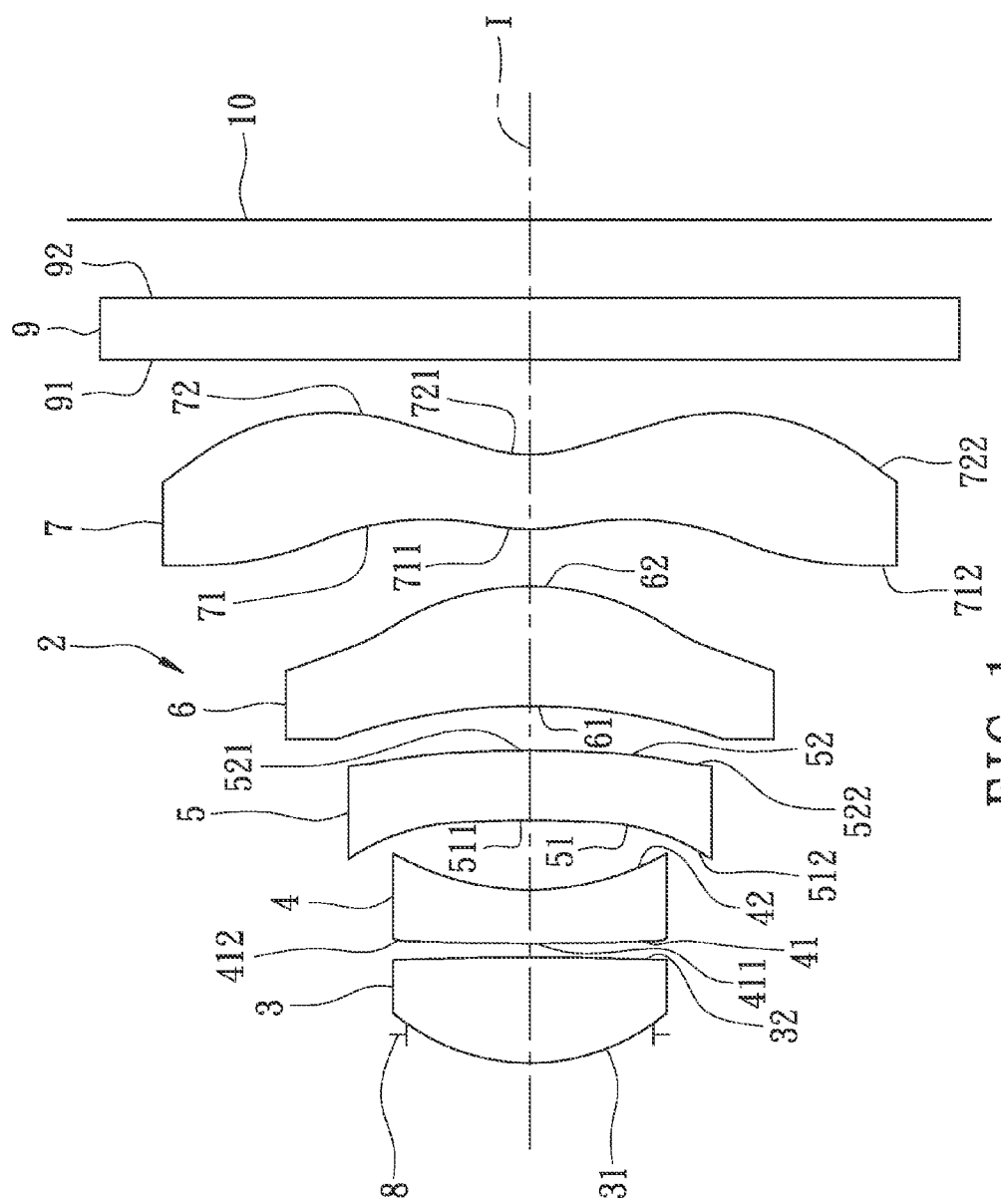
FIG. 1 is a schematic diagram that illustrates the first preferred embodiment of an imaging lens according to the present invention.
Figure 4:
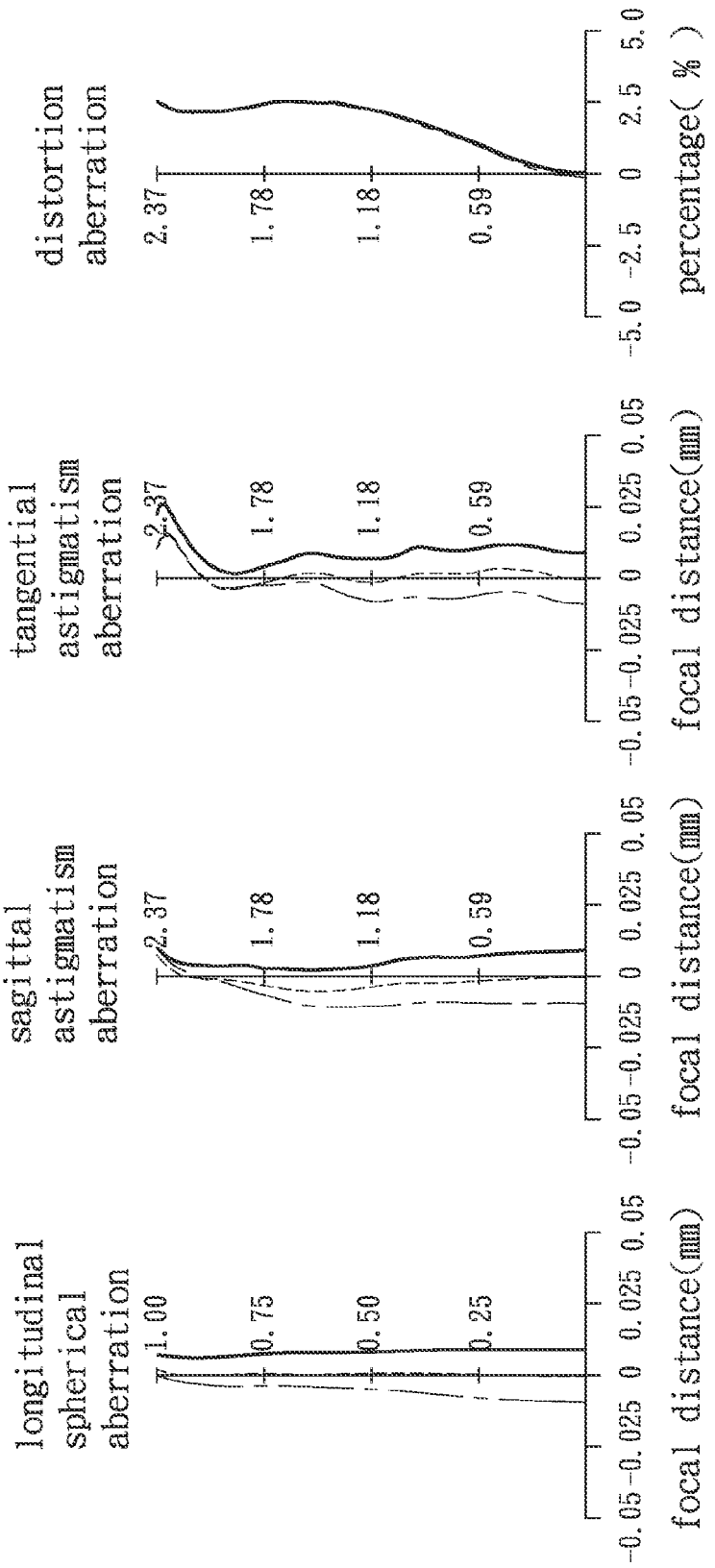
FIGS. 4(a) to 4(d) show different optical characteristics of the imaging lens of the first preferred embodiment.

Before the present invention is described in greater detail, it should be noted that like elements are denoted by the same reference numerals throughout the disclosure.

Referring to FIG. 1, an imaging lens 2 of the present invention includes an aperture stop 8, first, second, third, fourth, and fifth lens elements 3-7, and an optical filter 9 arranged in the given order along an optical axis (I) from an object side to an image side. The optical filter 9 is an infrared cut filter for filtering infrared light to thereby reduce aberration of images formed at an image plane 10.

Each of the first, second, third, fourth, and fifth lens elements 3-7 and the optical filter 9 has an object-side surface 31, 41, 51, 61, 71, 91 facing toward the object side, and an image-side surface 32, 42, 52, 62, 72, 92 facing toward the image side. Light entering the imaging lens 2 travels through the aperture stop 8, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 91, 92 of the optical filter 9, in the given order, to form an image on the image plane 10. Each of the object-side surfaces 31, 41, 51, 61, 71, 91 and the image-side surfaces 32, 42, 52, 62, 72, 92 has a center point coinciding with the optical axis (I).

The lens elements 3-7 are made of plastic material in this embodiment, and at least one of them may be made of other materials in other embodiments.

Relationships among some optical parameters of the imaging lens 2 of the present invention are as follows:

$$|v_2 - v_3| < 10; \tag{1}$$

$$0.5 < T_4/G_{AA} < 1.0; \tag{2}$$

$$0.33 < T_3/G_{AA} < 0.60; \tag{3}$$

$$5 < |f_4/T_{4-5}| < 8; \tag{4}$$

$$0.42 < |R_7/f_4| < 0.62; \text{ and} \tag{5}$$

$$T_4 > T_{L3A2-L4A1}5 \tag{6}$$

where:

"$v_2$" and "$v_3$" represent Abbe numbers of the second and third lens elements 4, 5, respectively;

"$T_4$" represents a distance between the center points of the object-side and image-side surfaces 61, 62 of the fourth lens element 6 (i.e., "$T_4$" represents a thickness of the fourth lens element 6 the optical axis (I));

"$G_{AA}$" represents a sum of a distance between the center points of the image-side and object-side surfaces 32, 41, a distance between the center points of the image-side and object-side surfaces 42, 51, a distance between the center points of the image-side and object-side surfaces 52, 61, and a distance between the center points of the image-side and object-side surfaces 62, 71 (i.e., "$G_{AA}$" represents a sum of widths of air gaps among the lenses 3-7 at the optical axis (I));

"$T_3$" represents a distance between the center points of the object-side and image-side surfaces 51, 52 of the third lens element 5 (i.e., "$T_3$" represents a thickness of the third lens element 5 at the optical axis (I));

"$f_4$" represents a focal length of the fourth lens element 6;

"$T_{4-5}$" represents a distance between the center points of the object-side surfaces 61, 71 of the fourth and fifth lens elements 6, 7;

"$R_7$" represents a radius of curvature of the object-side surface 61 at the center point thereof; and "$T_{L3A2-L4A1}$" represents a distance between the center points of the image-side and object-side surfaces 52, 61 (i.e., "$T_{L3A2-L4A1}$" represents the width of the air gap between the third and fourth lens elements 5, 6 at the optical axis (I)).

In the first preferred embodiment, which is depicted in FIG. 1, the first lens element 3 has a positive refracting power, and the object-side surface 31 and the image-side surface 32 thereof are aspherical convex surfaces.

The second lens element 4 has a negative refracting power, the object-side surface 41 thereof has a convex portion 411 in a vicinity of the optical axis (I) and another convex portion 412 in a vicinity of a periphery of the second lens element 4, and the image-side surface 42 thereof is a concave surface.

The third lens element 5 has a negative refracting power, the object-side surface 51 thereof has a convex portion 511 in a vicinity of the optical axis (I) and a concave portion 512 in a vicinity of a periphery of the third lens element 5, and the image-side surface 52 thereof has a concave portion 521 in a vicinity of the optical axis (I) and a convex portion 522 in a vicinity of the periphery of the third lens element 5.

The fourth lens element 6 has a positive refracting power, the object-side surface 61 thereof is a concave surface, and the image-side surface 62 thereof is a convex surface.

The fifth lens element 7 has a negative refracting power, the object-side surface 71 thereof has a convex portion 711 in a vicinity of the optical axis (I) and another convex portion 712 in a vicinity of a periphery of the fifth lens element 7, and the image-side surface 72 thereof has a concave portion 721 in a vicinity of the optical axis (I) and a convex portion 722 in a vicinity of the periphery of the fifth lens element 7.

In this embodiment, each of the object-side surfaces 31-71 and the image-side surfaces 32-72 is aspherical. However, configurations of the object-side and image-side surfaces 31-71, 32-72 are not limited to such.

The optical filter 9 is disposed between the fifth lens element 7 and the image plane 10, and is a piece of flat glass in this embodiment.

Relationships among some of the aforementioned optical parameters corresponding to the first preferred embodiment are as follows:

$|v_2-v_3|=2.75$;

$T_4/G_{AA}=0.71$;

$T_3/G_{AA}=0.40$;

$|f_4/T_{4-5}|=6.86$;

$|R_7/f_4|=0.45$.

In this embodiment, "$T_{L3A2-L4A1}$" is equal to 0.17, and "$T_4$" is equal to 0.56, which is greater than "$T_{L3A2-L4A1}$". The imaging lens 2 has an overall system focal length of 3.26 mm, a half field-of-view (HFOV) of 35.15°, and a system length of 3.68 mm. Shown in FIG. 2 is a table that shows values of some optical parameters corresponding to the surfaces 31-71, 32-72 of the first preferred embodiment.

Each of the object-side surfaces 31-71 and the image-side surfaces 32-72 satisfies the optical relationship of $$Z(Y) = \frac{Y^2}{R} \bigg/ \left( 1 + \sqrt{1 (1+K)\frac{Y^2}{R^2}} + \sum_{i=1}^{n} a_{2i} * Y^{2i} \right) \quad (7)$$

where:
"R" represents a radius of curvature of the surface;
"Y" represents a perpendicular distance between an arbitrary point on the surface and the optical axis (I);
"Z" represents a distance between projections of the arbitrary point and the center point of the surface onto the optical axis (I);
"K" represents a conic constant of the surface; and
"$a_{2i}$" represents a $2i^{th}$-order coefficient of the surface.

Shown in FIG. 3 is a table that shows values of some optical parameters of the aforementioned optical relationship (7) corresponding to the first preferred embodiment.

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

It can be understood from FIGS. 4(a), 4(b), 4(c) and 4(d) that the first preferred embodiment is able to achieve a good optical performance.

In view of the above, with the system length reduced down to below 4 mm, the imaging lens 2 of the first preferred embodiment is still able to achieve a relatively good optical performance.

Figure 5:
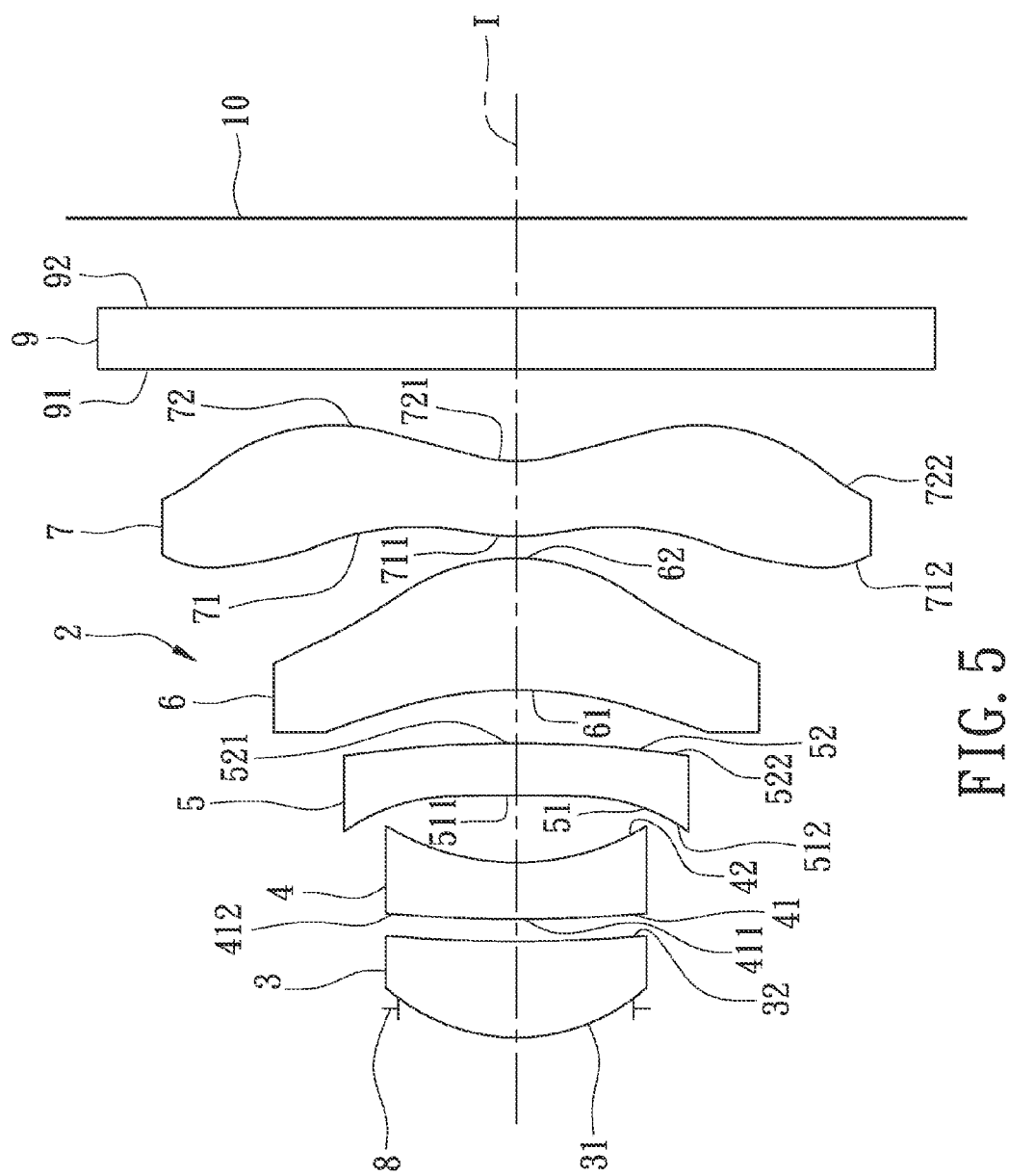
FIG. 5 is a schematic diagram that illustrates the second preferred embodiment of an imaging lens according to the present invention.

Referring to FIG. 5, the difference between the first and second preferred embodiments resides in that, in the second preferred embodiment, the image-side surface 32 of the first lens element 3 is a concave surface, and the second and third lens elements 4, 5 have Abbe numbers different from those of the second and third lens elements 4, 5 of the first preferred embodiment.

Relationships among some of the aforementioned optical parameters corresponding to the second preferred embodiment are as follows:

$|v_2-v_3|=0.64$;

$T_4/G_{AA}=0.93$;

$T_3/G_{AA}=0.37$;

$|f_4/T_{4-5}|=5.92$;

$|R_7/f_4|=0.47$.

Further, in this embodiment, "$T_{L3A2-L4A1}$" is equal to 0.21, and "$T_4$" is equal to 0.63, which is greater than "$T_{L3A2-L4A1}$".

In this embodiment, the imaging lens 2 has an overall system focal length of 3.25 mm, a half field-of-view (HFOV) of 35.36°, and a system length of 3.65 mm. Shown in FIG. 6 is a table that shows values of the optical parameters corresponding to the surfaces 31-71, 32-72 of the second preferred embodiment. Shown in FIG. 7 is a table that shows values of some parameters of the aforementioned optical relationship (7) corresponding to each of the object-side surfaces 31-71 and the image-side surfaces 32-72 of the second preferred embodiment.

FIGS. 8(a) to 8(d) show simulation results corresponding to longitudinal spherical aberration, sagittal astigmatism aberration, tangential astigmatism aberration, and distortion aberration of the second preferred embodiment, respectively.

Figure 8:
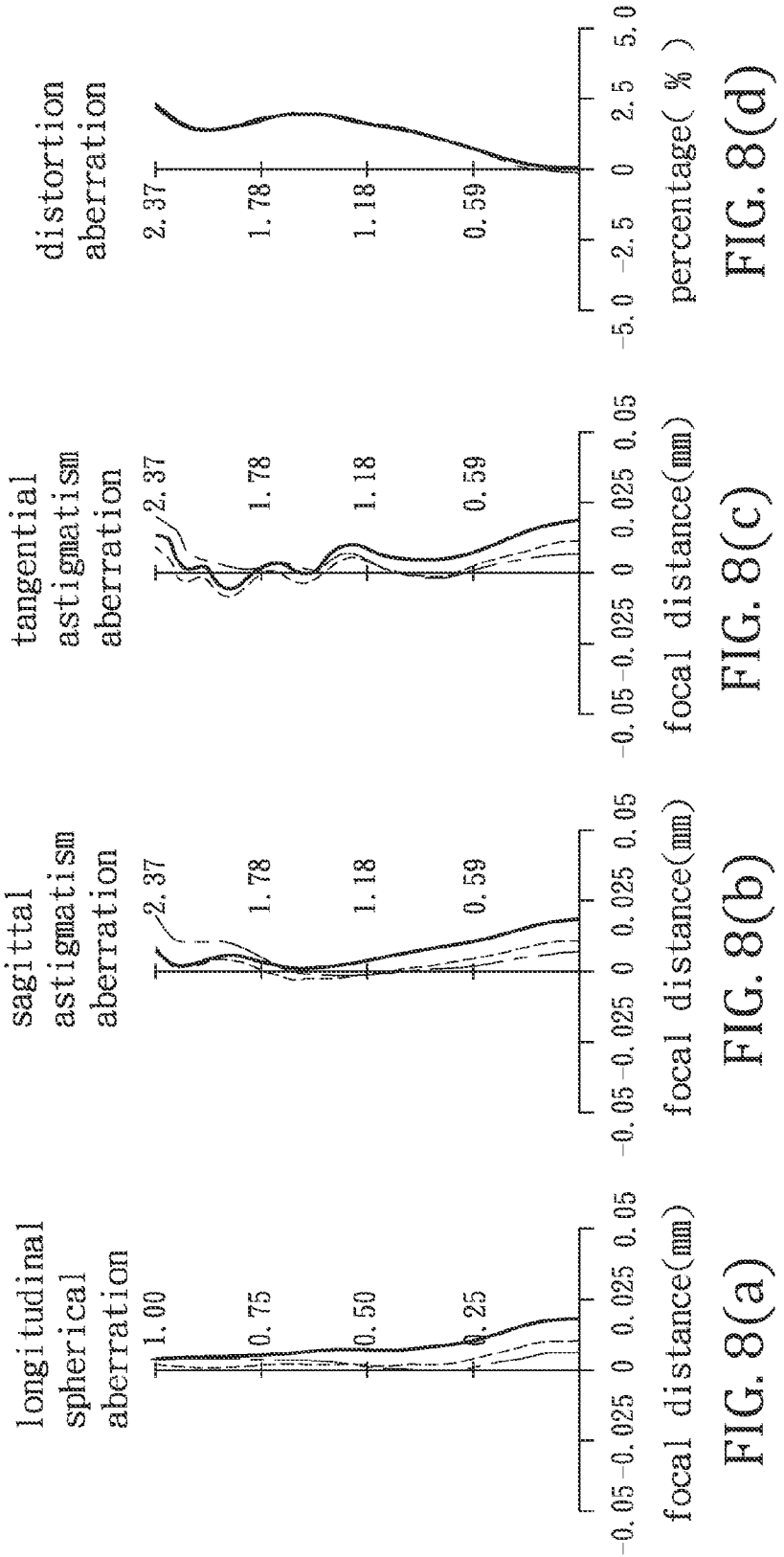
FIGS. 8(a) to 8(d) show different optical characteristics of the imaging lens of the second preferred embodiment.

It is apparent from FIG. 8(a) that the second preferred embodiment has a relatively low spherical aberration and a relatively low chromatic aberration at each of the wavelengths. It can be understood from FIGS. 8(b), 8(c) and 8(d) that the second preferred embodiment is able to achieve a good optical performance.

In view of the above, with the system length reduced down to below 4 mm, the imaging lens 2 of the second preferred embodiment is still able to achieve a relatively good optical performance.

Figure 9:
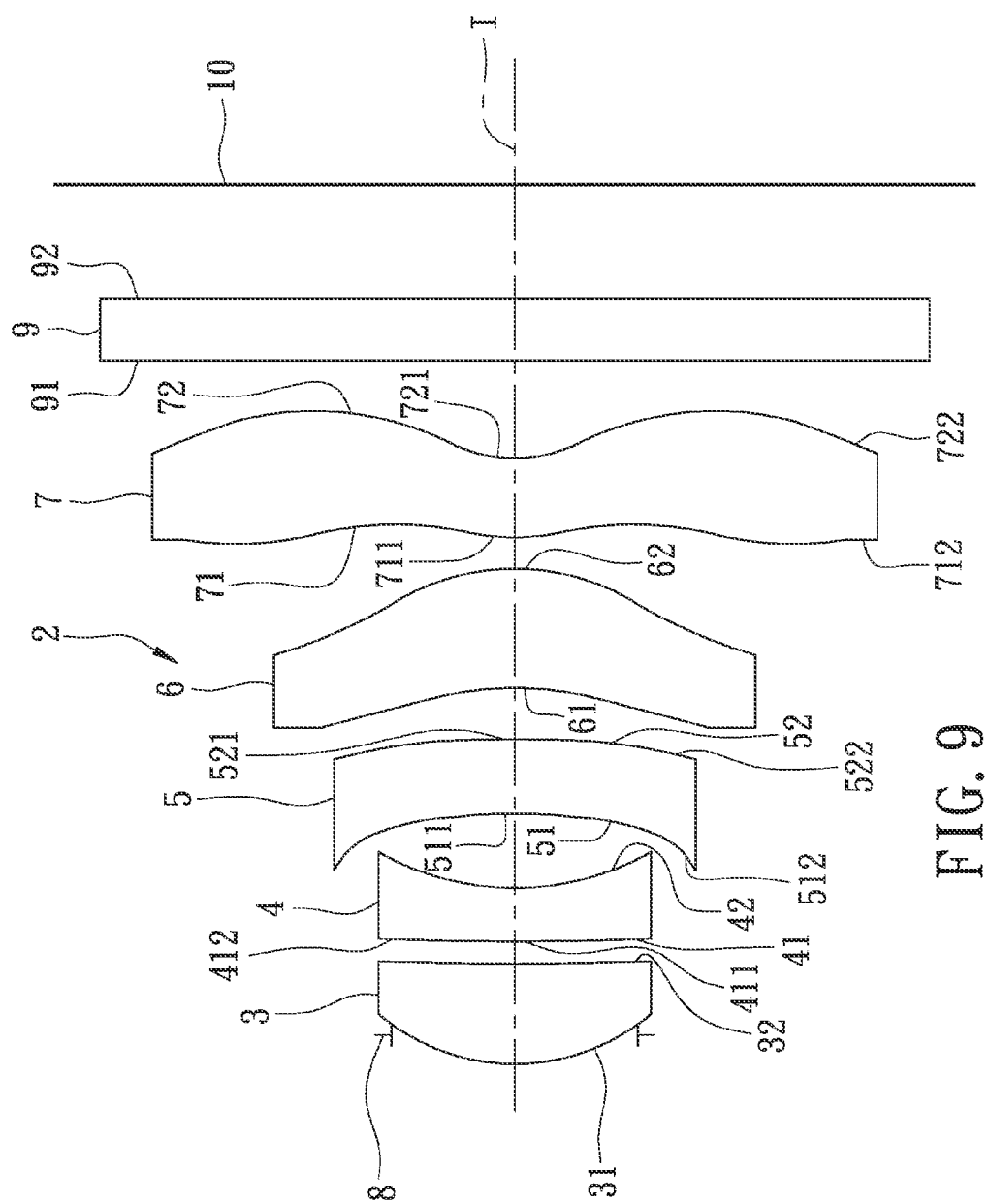
FIG. 9 is a schematic diagram that illustrates the third preferred embodiment of an imaging lens according to the present invention.
Figure 12:
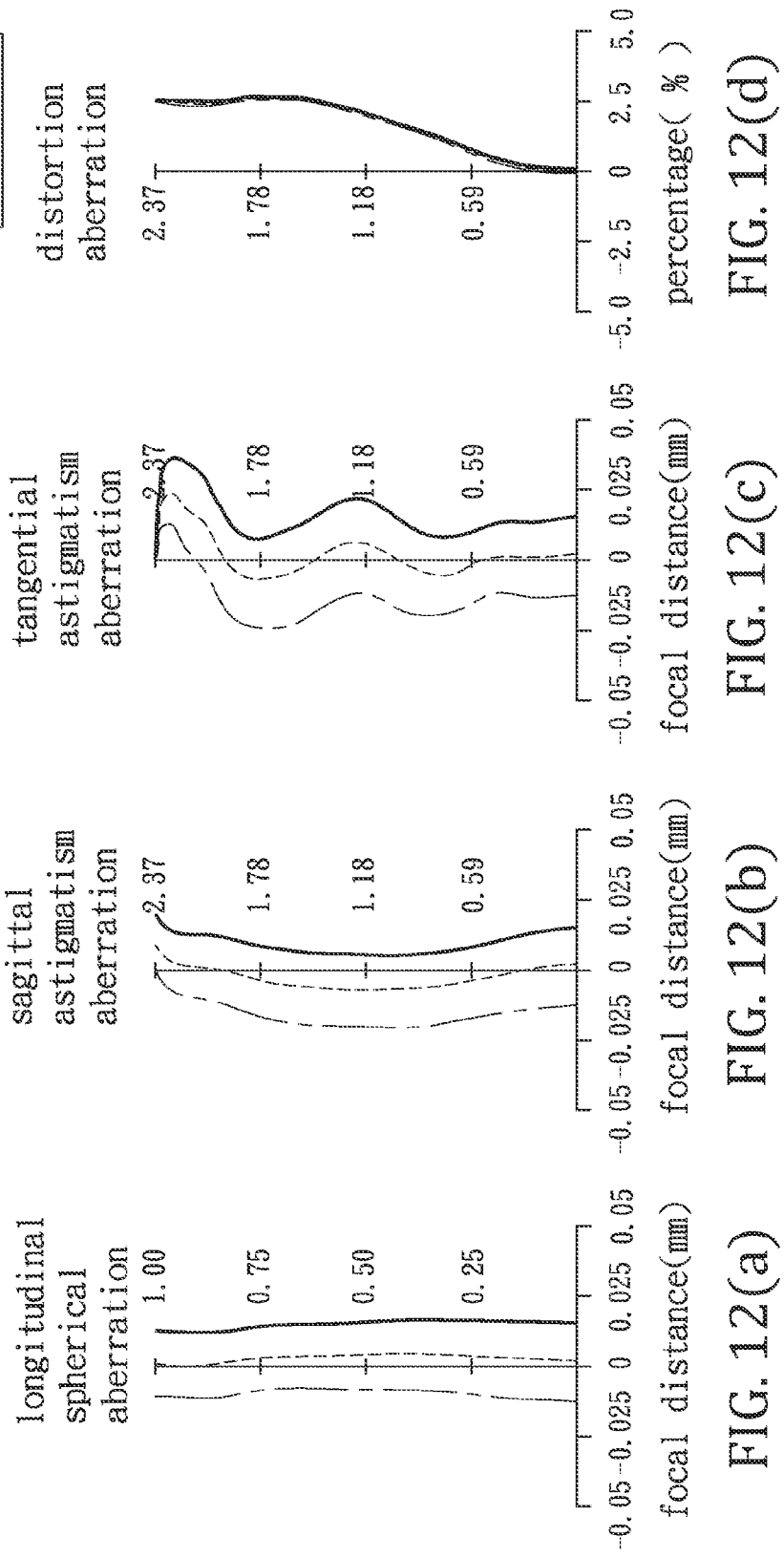
FIGS. 12(a) to 12(d) show different optical characteristics of the imaging lens of the third preferred embodiment.

Referring to FIG. 9, the difference between the first and third preferred embodiments resides in that, in the third preferred embodiment, the image-side surface 32 of the first lens element 3 is a concave surface, and the second lens element 4 has an Abbe number different from that of the second lens element 4 of the first preferred embodiment.

Relationships among some of the aforementioned optical parameters corresponding to the third preferred embodiment are as follows:

$|v_2-v_3|=6.02$;

$T_4/G_{AA}=0.82$;

$T_3/G_{AA}=0.51$;

$|f_4/T_{4-5}|=7.61$;

$|R_7/f_4|=0.47$.

Further, in this embodiment, "$T_{L3A2-L4A1}$" is equal to 0.16, and "$T_4$" is equal to 0.56, which is greater than "$T_{L3A2-L4A1}$".

In this embodiment, the imaging lens 2 has an overall system focal length of 3.25 mm, a half field-of-view (HFOV) of 35.26°, and a system length of 3.75 mm. Shown in FIG. 10 is a table that shows values of the optical parameters corresponding to the surfaces 31-71, 32-72 of the third preferred embodiment. Shown in FIG. 11 is a table that shows values of some parameters of the aforementioned optical relationship (7) corresponding to each of the object-side surfaces 31-71 and the image-side surfaces 32-72 of the third preferred embodiment.

Referring to FIGS. 12(a) to 12(d), with the system length reduced down to below 4 mm, the imaging lens 2 of the third preferred embodiment is still able to achieve a relatively good optical performance and a reduced chromatic aberration.

Figure 13:
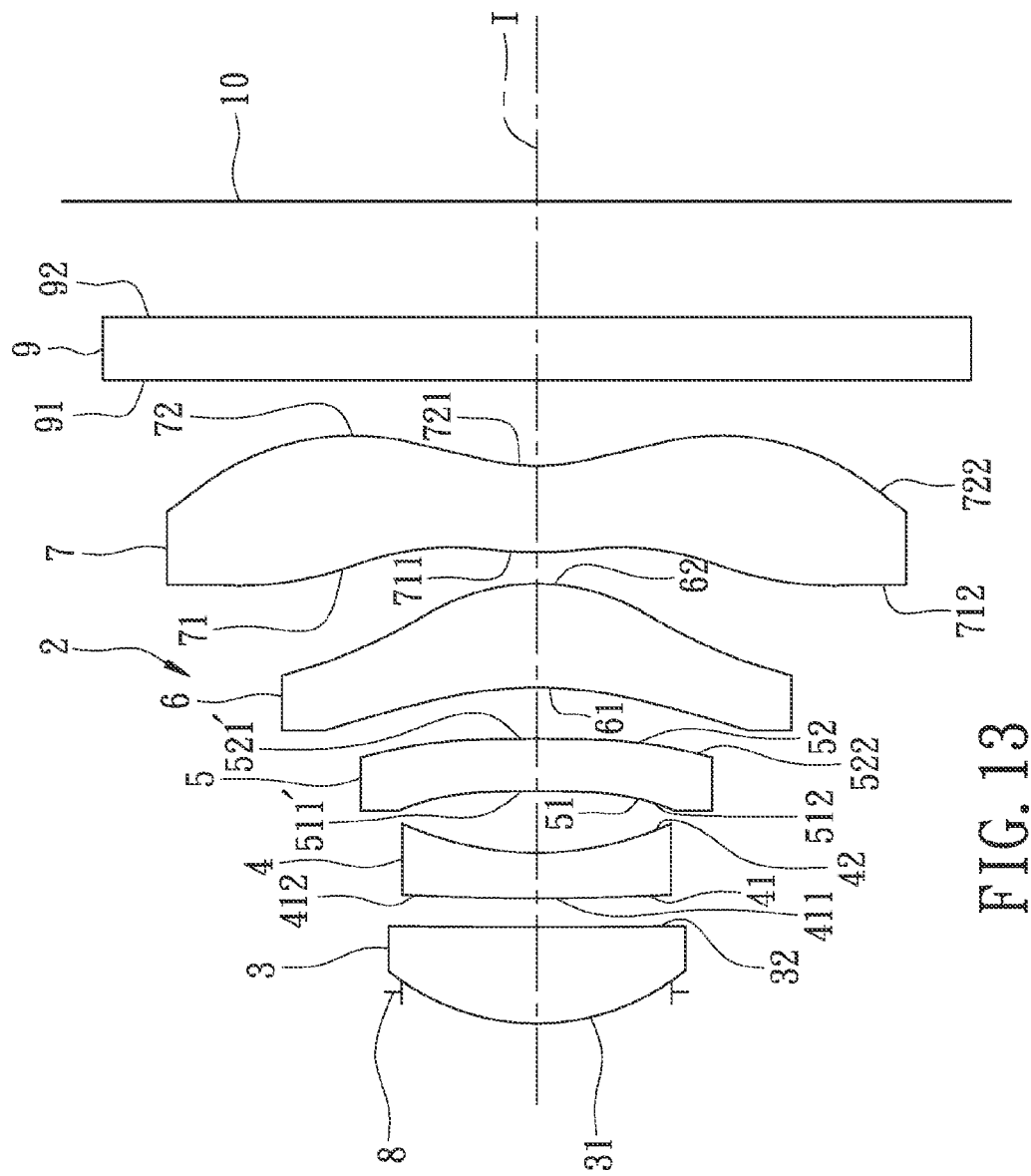
FIG. 13 is a schematic diagram that illustrates the fourth preferred embodiment of an imaging lens according to the present invention.
Figure 16:
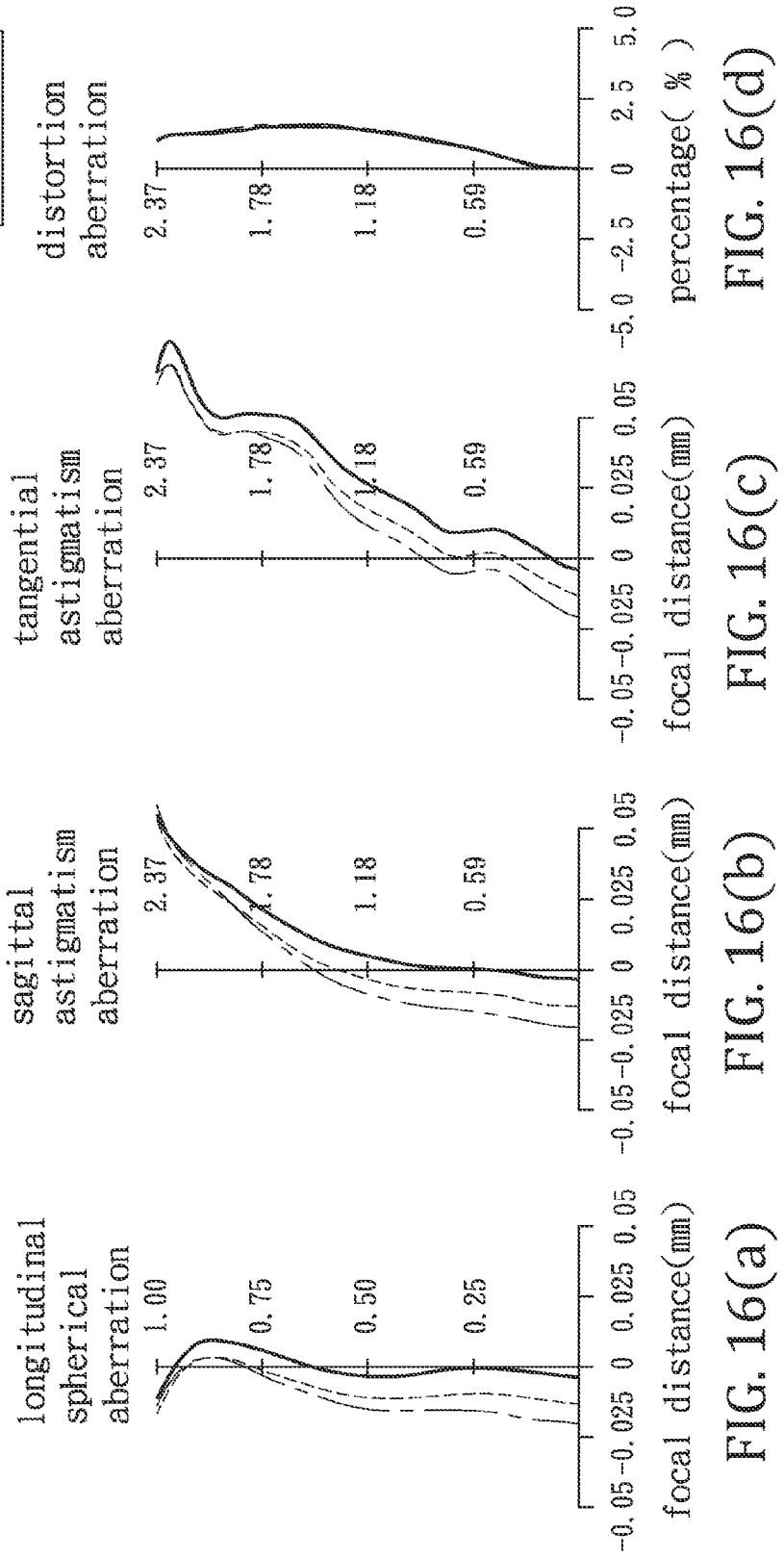
FIGS. 16(a) to 16(d) show different optical characteristics of the imaging lens of the fourth preferred embodiment.

Referring to FIG. 13, the difference between the first and fourth preferred embodiments resides in that, in the fourth preferred embodiment, the image-side surface 32 of the first lens element 3 is a concave surface, the object-side surface 51 of the third lens element 5 has a concave portion 511' in the vicinity of the optical axis (I), the image-side surface 52 of the third lens element 5 has a convex portion 521' in the vicinity of the optical axis (I), and the second lens element 4 has an Abbe number different from that of the second lens element 4 of the first preferred embodiment.

Relationships among some of the aforementioned optical parameters corresponding to the fourth preferred embodiment are as follows:

$|v_2-v_3|=0.00;$ $T_4/G_{AA}=0.68;$ $T_3/G_{AA}=0.35;$ $|f_4/T_{4-5}|=6.69;$ $|R_7/f_4|=0.56$

Further, in this embodiment, "$T_{L3A2-L4A1}$" is equal to 0.26, and "$T_4$" is equal to 0.52, which is greater than "$T_{L3A2-L4A1}$".

In this embodiment, the imaging lens 2 has an overall system focal length of 3.36 mm, a half field-of-view (HFOV) of 34.64°, and a system length of 3.59 mm. Shown in FIG. 14 is a table that shows values of the optical parameters corresponding to the surfaces 31-71, 32-72 of the fourth preferred embodiment. Shown in FIG. 15 is a table that shows values of some parameters of the aforementioned optical relationship (7) corresponding to each of the object-side surfaces 31-71 and the image-side surfaces 32-72 of the fourth preferred embodiment.

Referring to FIGS. 16(a) to 16(d), with the system length reduced down to below 4 mm, the imaging lens 2 of the fourth preferred embodiment is still able to achieve a relatively good optical performance.

Shown in FIG. 17 is a table that shows the aforesaid relationships among some of the aforementioned optical parameters corresponding to the preferred embodiments for comparison.

Effects of the various optical parameters on the imaging quality are described hereinafter.

Regarding optical relationship 1, when the imaging lens 2 satisfies optical relationship 1 (i.e., $|v_2-v_3|<10$), a difference in extent of dispersion between the second and third lens elements 4, 5 is relatively small, such that the refracting powers of the second lens element 4 and the third lens element 5 may be effectively distributed.

Regarding optical relationship 2, when the imaging lens 2 satisfies optical relationship 2 (i.e., $0.5<T_4/G_{AA}<1.0$), distribution of the thickness of the fourth lens element 6 with respect to the sum of the widths of the air gaps among the lens elements 3-7 is optimal. When the imaging lens 2 satisfies $T_4/G_{AA}\geq1.0$, the thickness of the fourth lens element 6 may be too large and the radius of curvature of the same may be too small, such that sensitivity of the imaging lens 2 to inaccuracy of the manufacturing process may be too high. On the other hand, when the imaging lens 2 satisfies $T_4/G_{AA}\leq0.5$, the widths of the air gaps among the lens elements 3-7 need to be increased, which may be unfavorable for reducing the overall system length of the imaging lens 2.

When the imaging lens 2 satisfies optical relationship 3 (i.e., $0.33<T_3/G_{AA}<0.60$), distribution of the thickness of the third lens element 5 with respect to the sum of the widths of the air gaps among the lens elements 3-7 is optimal. When the imaging lens 2 satisfies $T_3/G_{AA}\geq0.60$, the widths of the air gaps among the lens elements 3-7 may be too small, which may render manufacturing of the imaging lens 2 difficult. On the other hand, when the imaging lens 2 satisfies $T_3/G_{AA}\leq0.33$, the thickness of the third lens element 5 may be too small, which may also render manufacturing of the imaging lens 2 difficult.

Regarding optical relationship 4, when the imaging lens 2 satisfies optical relationship 4 (i.e., $5<|f_4/T_{4-5}|<8$), the refracting power of the fourth lens element 6 has minimal influence upon distribution of overall refracting power of the imaging lens 2, and the distance between the object-side surfaces 61, 71 of the fourth and fifth lens elements 6, 7 is optimal, such that the height, at which light from the fourth lens element 6 enters the fifth lens element 7, falls within an optimal range. When the imaging lens 2 satisfies $|f_4/T_{4-5}|\geq8$, the distance between the object-side surfaces 61, 71 may be too small such that the height, at which light from the fourth lens element 6 enters the fifth lens element 7, falls outside of the optimal range. When the imaging lens 2 satisfies $|f_4/T_{4-5}|\leq5$, the focal length of the fourth lens element 6 may be too small and the refracting power of the same may be too large, which may have an adverse effect on the distribution of the overall refracting power of the imaging lens 2 and may cause severe aberration.

Regarding optical relationship 5 (i.e., $0.42<|R_7/f_4|<0.62$), when the imaging lens 2 satisfies optical relationship 5, effective distribution of the overall refracting power of the imaging lens 2 may be achieved without increasing difficulty of manufacturing. Preferably, the imaging lens 2 satisfies $0.42<|R_7/f_4|<0.60$. When the imaging lens 2 satisfies $|R_7/f_4|\geq0.62$, the focal length of the fourth lens element 6 may be too small and the refracting power of the same may be too large, which may have an adverse effect upon the distribution of the overall refracting power of the imaging lens 2. On the other hand, when the imaging lens 2 satisfies $|R_7/f_4|\leq0.42$, the radius of curvature of the object-side surface 61 of the fourth lens element 6 may be too small, which may result in increased difficulty and hence cost of manufacturing of the fourth lens element 6.

Regarding optical relationship 6, when the imaging lens 2 satisfies optical relationship 6 (i.e., $T_4>T_{L3A2-L4A1}$), the distance between the third and fourth lens elements 5, 6 falls within an optimal range, thereby facilitating miniaturization of the imaging lens 2.

Aside from the above optical parameters, effects achieved through designs of the object-side surfaces 31-71 and the image-side surfaces 32-72 are described hereinafter.

By virtue of the positive refracting power and the convex object-side surface 31 of the first lens element 3, the first lens element 3 is able to achieve a good light receiving capability and to distribute partly the refracting power of the second lens element 4.

Through arranging the aperture stop 8 such that the first lens element 3 is disposed between the aperture stop 8 and the second lens element 4, the system length of the imaging lens 2 may be effectively reduced.

By virtue of the negative refracting power and the concave image-side surface 42 of the second lens element 4, as well as the negative refracting power of the third lens 5, aberration of images formed at the image plane 10 may be effectively reduced or even eliminated.

Since the design of the convex image-side surface 62 of the fourth lens element 6 is favorable for increasing the light receiving capability and reducing the overall system length, the concave image-side surface 61 of the fourth lens element 6 may be matched with the convex image-side surface 62 for further increasing the light receiving capability of the imaging lens 2.

The design of the concave portion 721 and the convex portion 722 of the image-side surface 72 of the fifth lens element 7 is favorable for reducing distortion and aberration, and is capable of achieving better control of the angle of light travelling through the fifth lens element 7 toward the image plane 10, at which an image sensor is to be disposed, to fall within an optimal range. In addition, the convex portion 711 of the object-side surface 71 of the fifth lens element 7 serves to reduce aberration.

Figure 18:
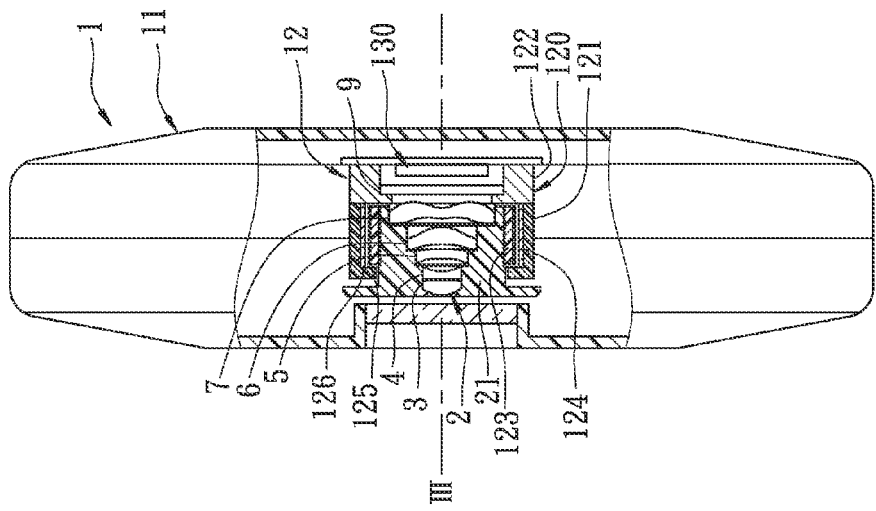
FIG. 18 is a schematic partly sectional view to illustrate a first exemplary application of the imaging lens of the present invention.

Shown in FIG. 18 is a first exemplary application of the imaging lens 2, in which the imaging lens 2 is disposed in a housing 11 of an electronic apparatus 1 (such as a mobile phone), and forms a part of an imaging module 12 of the electronic apparatus 1. The imaging module 12 includes a barrel 21 on which the imaging lens 2 is disposed, a seat unit 120 on which the barrel 21 is disposed, and an image sensor 130 disposed at the image plane 10 (see FIG. 1) and operatively associated with the imaging lens 2 for capturing images.

The seat unit 120 includes a first seat portion 121 in which the barrel 21 is disposed, and a second seat portion 122 having a portion interposed between the first seat portion 121 and the image sensor 130. The barrel 21 and the first seat portion 121 of the seat unit 120 extend along an axis (II), which coincides with the optical axis (I) of the imaging lens 2.

Figure 19:
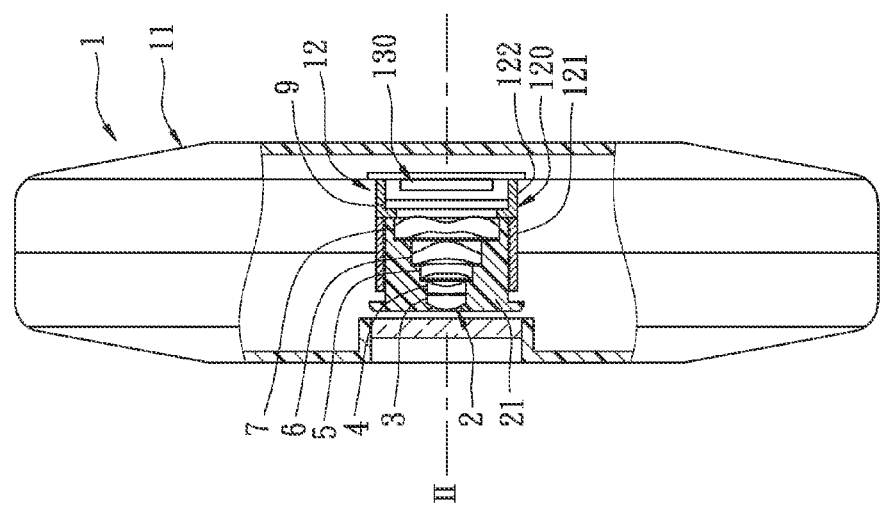
FIG. 19 is a schematic partly sectional view to illustrate a second exemplary application of the imaging lens of the present invention.

Shown in FIG. 19 is a second exemplary application of the imaging lens 2. The difference between the first and second exemplary applications resides in that, in the second exemplary application, the seat unit 120 is configured as a voice-coil motor (VCM), and the first seat portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 2 therein, are movable with respect to the image sensor 130 along an axis (III), which coincides with the optical axis (I) of the imaging lens 2. The optical filter 9 of the imaging lens 2 is disposed at the second seat portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 2 of the present invention, the electronic apparatus 1 in each of the exemplary applications may be configured to have a relatively reduced overall thickness. Furthermore, application and configuration of the imaging lens 2 are not limited to such.

During manufacture, the first lens element 3 may be formed with an extending portion, which may be flat or stepped in shape. In terms of function, while the object-side and image-side surfaces 31, 32 are configured to enable passage of light through the first lens element 3, the extending portion merely serves to provide the function of installation and does not contribute toward passage of light through the first lens element 3. The other lens elements 4-7 may also be formed with extending portions similar to that of the first lens element 3.

In summary, the system length of the imaging lens 2 may be reduced to below 4 mm without significantly compromising the optical performance of the imaging lens 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical imaging lens comprising, from an object side to an image side, an aperture stop, a first lens element, a second lens element, a third lens element, a fourth lens element, and a fifth lens element, each of the first, second, third, fourth and fifth lens element having an object-side surface facing toward the object side and an image-side surface facing toward the image side, wherein:
   the first lens element has a positive refracting power, and the object-side surface of the first lens element has a convex portion in a vicinity of an optical axis and a convex portion near a circumference of the first lens element;
   the second lens element has a negative refracting power;
   the third lens element has a negative refracting power, and the object-side surface of the third lens element has a concave portion near a circumference of the third lens element;
   the fourth lens element has a positive refracting power, the object-side surface of the fourth lens element has a concave portion in a vicinity of the optical axis and a concave portion near a circumference of the fourth lens element, and the image-side surface of the fourth lens element has a convex portion in a vicinity of the optical axis and a convex portion near the circumference of the fourth lens element;
   the image-side surface of the fifth lens element has a concave portion in a vicinity of the optical axis and a convex portion near a circumference of the fifth lens element;
   the optical imaging lens has only five lens elements having a refracting power; and
   the optical imaging lens satisfies the following relations:

$$0.61 \leq T3/T5 \leq 0.93; \text{and}$$

$$0.72 \leq T2/AG23 \leq 0.87,$$

wherein T3 is a thickness of the third lens element along the optical axis, T5 is a thickness of the fifth lens element along the optical axis, T2 is a thickness of the second lens element along the optical axis, and AG23 is a width of an air gap between the second and third lens elements along the optical axis.

2. The optical imaging lens of claim 1, wherein a ratio T3/AG12 is between 2.68 and 7.09, wherein AG12 is a width of an air gap between the first and second lens elements along the optical axis.

3. The optical imaging lens of claim 1, wherein a ratio T2/AG34 is between 0.85 and 1.58, wherein AG34 is a width of an air gap between the third and fourth lens elements along the optical axis.

4. The optical imaging lens of claim 1, wherein a ratio T5/AG12 is between 4.33 and 7.79, wherein AG12 is a width of an air gap between the first and second lens elements along the optical axis.

5. The optical imaging lens of claim 1, wherein a ratio T4/AAG is between 0.68 and 0.93, wherein T4 is a thickness of the fourth lens element along the optical axis and AAG is a sum of widths of air gaps between the first to fifth lens elements.

6. The optical imaging lens of claim 1, wherein a ratio T1/T3 is between 1.40 and 1.96, wherein T1 is a thickness of the first lens element along the optical axis.

7. An optical imaging lens comprising, from an object side to an image side, an aperture stop, a first lens element, a second lens element, a third lens element, a fourth lens element, and a fifth lens element, each of the first, second, third, fourth and fifth lens element having an object-side surface facing toward the object side and an image-side surface facing toward the image side, wherein:

the first lens element has a positive refracting power, and the object-side surface of the first lens element has a convex portion in a vicinity of an optical axis and a convex portion near a circumference of the first lens element;

the second lens element has a negative refracting power;

the third lens element has a negative refracting power, and the object-side surface of the third lens element has a concave portion near a circumference of the third lens element;

the object-side surface of the fourth lens element has a concave portion near a circumference of the fourth lens element, and the image-side surface of the fourth lens element has a convex portion in a vicinity of the optical axis and a convex portion near the circumference of the fourth lens element;

the image-side surface of the fifth lens element has a concave portion in a vicinity of the optical axis and a convex portion near a circumference of the fifth lens element;

the optical imaging lens has only five lens elements having a refracting power; and the optical imaging lens satisfies the following relations:

$0.61 \leq T3/T5 \leq 0.93$;

$0.68 \leq T4/AAG23 \leq 0.93$; and $0.81 \leq T3/AG23 \leq 1.08$, wherein T3 is a thickness of the third lens element along the optical axis, T5 is a thickness of the fifth lens element along the optical axis, T4 is a thickness of the fourth lens element along the optical axis, AAG is a sum of widths of air gaps between the first to fifth lens elements, and AG23 is a width of an air gap between the second and third lens elements along the optical axis.

8. The optical imaging lens of claim 7, wherein a ratio T4/AG45 is between 2.09 and 5.74, wherein AG45 is a width of an air gap between the fourth and fifth lens elements along the optical axis.

9. The optical imaging lens of claim 7, wherein a ratio T3/AG34 is between 1.04 and 2.18, wherein AG34 is a width of an air gap between the third and fourth lens elements along the optical axis.

10. The optical imaging lens of claim 7, wherein a ratio T2/AG12 is between 2.20 and 5.53, wherein T2 is a thickness of the second lens element along the optical axis and AG12 is a width of an air gap between the first and second lens elements along the optical axis.

11. The optical imaging lens of claim 7, wherein a ratio T1/AG34 is between 1.88 and 3.06, wherein T1 is a thickness of the first lens element along the optical axis and AG34 is a width of an air gap between the third and fourth lens elements along the optical axis.

12. The optical imaging lens of claim 7, wherein a ratio T3/ALT is between 0.13 and 0.18, wherein ALT is a sum of thicknesses of the first to fifth lens elements.

13. An optical imaging lens comprising, from an object side to an image side, an aperture stop, a first lens element, a second lens element, a third lens element, a fourth lens element, and a fifth lens element, each of the first, second, third, fourth and fifth lens element having an object-side surface facing toward the object side and an image-side surface facing toward the image side, wherein:

the first lens element has a positive refracting power, and the object-side surface of the first lens element has a convex portion in a vicinity of an optical axis and a convex portion near a circumference of the first lens element;

the second lens element has a negative refracting power;

the third lens element has a negative refracting power, and the object-side surface of the third lens element has a concave portion near a circumference of the third lens element;

the object-side surface of the fourth lens element has a concave portion near a circumference of the fourth lens element, and the image-side surface of the fourth lens element has a convex portion in a vicinity of the optical axis and a convex portion near the circumference of the fourth lens element;

the image-side surface of the fifth lens element has a concave portion in a vicinity of the optical axis and a convex portion near a circumference of the fifth lens element;

the optical imaging lens has only five lens elements having a refracting power; and the optical imaging lens satisfies the following relations:

$0.61 \leq T3/T5 \leq 0.93$;

$0.64 \leq AG34/AG45 \leq 2.53$;

$0.14 \leq AG12/AG23 \leq 0.33$; and $0.12 \leq T3/ALT \leq 0.18$, wherein T3 is a thickness of the third lens element along the optical axis, T5 is a thickness of the fifth lens element along the optical axis, AG34 is a width of an air gap between the third and fourth lens elements along the optical axis, AG45 is a width of an air gap between the fourth and fifth lens elements along the optical axis, AG12 is a width of an air gap between the first and second lens elements along the optical axis, AG23 is a width of an air gap between the second and third lens elements along the optical axis, and ALT is a sum of thicknesses of the first to fifth lens elements.

14. The optical imaging lens of claim 13, wherein a ratio T2/T5 is between 0.50 and 0.77, wherein T2 is a thickness of the second lens element along the optical axis.

15. The optical imaging lens of claim 13, wherein a ratio AG12/AG45 is between 0.16 and 1.00.

16. The optical imaging lens of claim 13, wherein a ratio AG45/AAG is between 0.13 and 0.34, wherein AAG is a sum of widths of air gaps between the first to fifth lens elements.

17. The optical imaging lens of claim 13, wherein a ratio T1/AG12 is between 4.82 and 10.92, wherein T1 is a thickness of the first lens element along the optical axis.

18. The optical imaging lens of claim 13, wherein a ratio T4/AG12 is between 5.17 and 12.58, wherein T4 is a thickness of the fourth lens element along the optical axis.

19. The optical imaging lens of claim 13, wherein a ratio ALT/AG12 is between 19.21 and 43.74.

* * * * *